(12) United States Patent
Smith et al.

(10) Patent No.: US 6,662,417 B2
(45) Date of Patent: Dec. 16, 2003

(54) METHOD OF MANUFACTURING A SWIVEL HOOK HAVING A STAMPED HOOK BODY AND FORGED SWIVEL CONNECTOR

(75) Inventors: Keith A. Smith, Burlington (CA); Steve B. Levay, Font Hill (CA); John Dunsby, Welland (CA)

(73) Assignee: Haun Drop Forge Co., Ltd. (CA)

( * ) Notice: Subject to any disclaimer, the term of this patent is extended or adjusted under 35 U.S.C. 154(b) by 0 days.

(21) Appl. No.: 10/259,779

(22) Filed: Sep. 30, 2002

(65) Prior Publication Data

US 2003/0051321 A1 Mar. 20, 2003

Related U.S. Application Data

(62) Division of application No. 09/816,442, filed on Mar. 26, 2001, now Pat. No. 5,557,219.

(51) Int. Cl.7 .................................................. B21K 1/44
(52) U.S. Cl. .............................. 29/7; 24/298; 24/599.1; 24/598.4
(58) Field of Search ..................... 29/7; 24/298, 299, 24/300, 301, 599.1, 598.4, 598.7; 59/84; 294/82.17

(56) References Cited

U.S. PATENT DOCUMENTS

| | | |
|---|---|---|
| 354,481 A | 12/1886 | McKay |
| 1,289,096 A | 12/1918 | Boatright |
| 1,353,026 A | 9/1920 | Clare |
| 1,534,879 A | 4/1925 | Stewart |
| 1,545,377 A * | 7/1925 | Westmoreland |
| 1,707,721 A | 4/1929 | Hoffman |
| 2,833,017 A | 5/1958 | Patton |
| RE38,035 E * | 3/2003 | Kahn .......................... 224/268 |

OTHER PUBLICATIONS

Peninsula Safety Components Catalogue, Oct. 1999, pp. 4–1, 4–2, 4–3, 5–4, 19–1, 19–2, 19–3, 19–4, 22–3 and 22–11.

* cited by examiner

*Primary Examiner*—Gregory Vidovich
*Assistant Examiner*—Stephen Kenny
(74) *Attorney, Agent, or Firm*—Merek, Blackmon & Voorhees, LLC (57) ABSTRACT

A method of constructing a swivel hook. The method comprises the steps of: forming a hook body by way of a stamping process; forming a swivel connector by means of a forging process; placing a first washer having a rectangular shaped right angled bore over a rectangular stem on the hook body; inserting the rectangular stem of the hook body through a circular bore in a first end of the swivel connector; placing a second washer having a generally rectangular shaped right angled bore over the rectangular stem of the hook body and into abutment with the swivel connector such that the end of the stem extends through the second washer; and, thereafter, peening the tip of the rectangular stem extending through the second washer to secure the second washer in place over the rectangular stem.

6 Claims, 7 Drawing Sheets

METHOD OF MANUFACTURING A SWIVEL HOOK HAVING A STAMPED HOOK BODY AND FORGED SWIVEL CONNECTOR

RELATED APPLICATION

The subject patent application is a divisional patent application of U.S. patent application Ser. No. 09/816,442 filed on Mar. 26, 2001 and is now U.S. Pat. No. 5,557,219.

FIELD OF THE INVENTION

This invention relates generally to swivel hooks, and more particularly a new and improved swivel hook and its method of manufacture.

BACKGROUND OF THE INVENTION

Lifting and safety hooks have a wide range of applications in a vast array of industries and recreational pursuits. While there are many different types of hooks that have been designed for many different applications, one particular commonly used hook is known as a swivel hook. In general, a swivel hook comprises a primary body having a hook member at one end and a rotatable or pivotal swivel eye, connector or clevis at the opposite end. Use of the hook enables a load that is secured to the hook portion to be rotated independently of the rope, cable, strap or other tethering apparatus attached to the hook by way of the swivel eye. The ability of its hook portion to rotate independently of its connecting eye makes a swivel hook highly desirable where there is need to prevent rotational movement and/or forces from being transferred from the hook body through to the rope, cable or tether to which the hook is attached. Swivel hooks allow for the accommodation of rotational forces that may be applied to the hook body without the necessity of using intervening devises or swivel connectors. Depending upon the application, the hook may also be equipped with a gatekeeper and one or more of a variety of locking mechanisms to prevent accidental opening of the gatekeeper.

Typically the primary components of a hook are formed from parts that are made by way of either a forging or a stamping process. Traditionally, where a high strength product is required the primary components would have been forged. Forging generally results in a high strength product capable of withstanding significant tensile and/or compressive loading. In contrast, hooks formed from components manufactured through stamping processes are generally limited to loads significantly less than those that may be borne by forged hooks. However, stamped hooks have the advantage of often being lighter and less costly to manufacture.

The fact that stamped hooks are generally less costly to manufacture, together with the realization that although not having the strength of a forged product they nevertheless have more than sufficient strength for a wide variety of applications, has made stamped hooks a desirable alternative to more traditional forged products. Unfortunately an inherent limitation within the stamping process that is carried through to the end product resides in the fact that stamping involves stamping or punching a particular shape from an blank sheet of material. Accordingly, the punched or stamped product is planer in nature, of a relatively constant thickness, and has square side walls that are generally perpendicular to the upper and lower surfaces. Forming rounded edges, posts, or other 3-dimensional features typically requires subsequent machining, which can add significantly to the overall manufacturing costs. Furthermore, while stamped products often exhibit relatively good strength characteristics in compression and tension, their planer nature and uniform thickness often presents a significant limitation with respect to their ability to withstand torsional stress. On the other hand forging permits a wide variety of 3-dimensional design features to be incorporated into the hook, including design features that enhance torsional loading characteristics.

SUMMARY OF THE INVENTION

The invention therefore provides a hook that addresses a number of the limitations associated with existing hooks through providing a hook body that may be formed from a stamping process and that is capable of receiving a swivel, connector or clevis thereon without the need for subsequent machining.

Accordingly, in one of its aspects the invention provides A swivel hook comprising a hook body having a generally uniform thickness and stamped from a sheet of material, said hook body having a hook member formed at a first end and a longitudinally oriented stem formed at a second opposite end, said stem having a generally rectangular cross-section; and, a swivel connector pivotally securable over said stem and formed from a forged metal, said swivel connector having a generally circular bore of a size exceeding the rectangular cross-section of said stem such that said stem may be received through said bore to secure said swivel connector to said hook body while permitting rotational movement of said swivel connector about said stem.

In a further aspect the invention provides swivel hook comprising a hook body having a generally uniform thickness and formed by way of a stamping operation, said hook body having a hook member formed at a first end and a generally rectangular, longitudinally oriented, stem formed at a second opposite end, a connector securable over said rectangular stem, said connector having a bore therethrough for receiving said rectangular stem and for securing said connector to said hook body, said connector permitting said hook body to be attached to a rope, cable or tether; and, first and second washers, said first washer received over said rectangular stem between said hook body and said connector and said second washer received over said rectangular stem between said connector and the end of said stem with a portion of the end of said stem extending through said second washer, said second washer secured to said stem and retaining said connector and said first washer in place about said stem, said first and second washers assisting in the transference of torsional loading between said hook body and said connector and tending to maintain said hook body and said connector in a co-planer relationship.

In yet a further embodiment the invention provides a method of constructing a swivel hook, the method comprising: forming a hook body by way of a stamping process wherein the hook body is stamped from material having a generally uniform thickness, said hook body formed with a hook member at a first end and a generally rectangular, longitudinally oriented, stem at a second opposite end, said rectangular stem having a base portion connecting said stem to said hook body and an end portion that terminates in an outwardly disposed tip; forming a swivel connector by means of a forging process, said swivel connector having a first end securable over said rectangular stem of said hook body and a second end adapted to secure said swivel connector to a rope, cable, tether or object, said first end of said swivel connector having a generally circular bore therethrough for receiving said rectangular stem of said hook body, said bore dimensioned so as to permit rotational movement of said swivel connector about said rectangular stem when received thereon; placing a first washer having a rectangular shaped right angled bore over said stem; inserting said rectangular stem through said circular bore in said first end of said swivel connector; placing a second washer having a generally rectangular shaped right angled bore over said rectangular stem and into abutment with said swivel connector with the end of said stem extending through said second washer; and, thereafter, peening said tip of said rectangular stem extending through said second washer to secure said second washer in place over said rectangular stem.

Further aspects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

In the attached drawings the swivel hook according to one embodiment of the invention is noted generally by reference numeral 1. Hook 1 is comprised primarily of a hook body 2 and a swivel connector 3. Swivel connector 3 may take the general form of a swivel eye (as shown). However, in alternate embodiments of the invention the connector could be in the form of a clevis or other form of mechanism allowing hook 1 to be secured to a rope, chain, cable, tether strap, or other object or device. In the version of the hook shown in the drawings there is included a gatekeeper 4 and a locking member 5. The existence or absence of a gatekeeper and/or one or more locking members is not an essential feature of the invention and it will be appreciated that any variety of commonly used gatekeepers and/or locking devices could be utilized without affecting the scope of the invention. Alternatively, hook body 2 could be assembled without any gatekeepers or locking members if such mechanisms are not necessary for the desired end use of the hook According to the present invention hook body 1 is formed through a stamping process by which the hook body is stamped or punched from a sheet of stock material. Preferably such material is comprised of a relatively high strength metallic alloy in order to provide the stamped product with a sufficient degree of tensile and compressive strength for the application for which it is intended. The formation of the hook body may be accomplished through the use of any one of a variety of commonly used stamping processes, including through the use of a specifically designed set of dies and a traditional stamping press. Through the formation of hook body 1 in such a manner it will be understood by those skilled in the art that the hook body will be of a generally constant thickness having a relatively planer upper surface 6 and lower surface 7, with side surfaces 8 extending therebetween at generally right angles.

Figure 3:
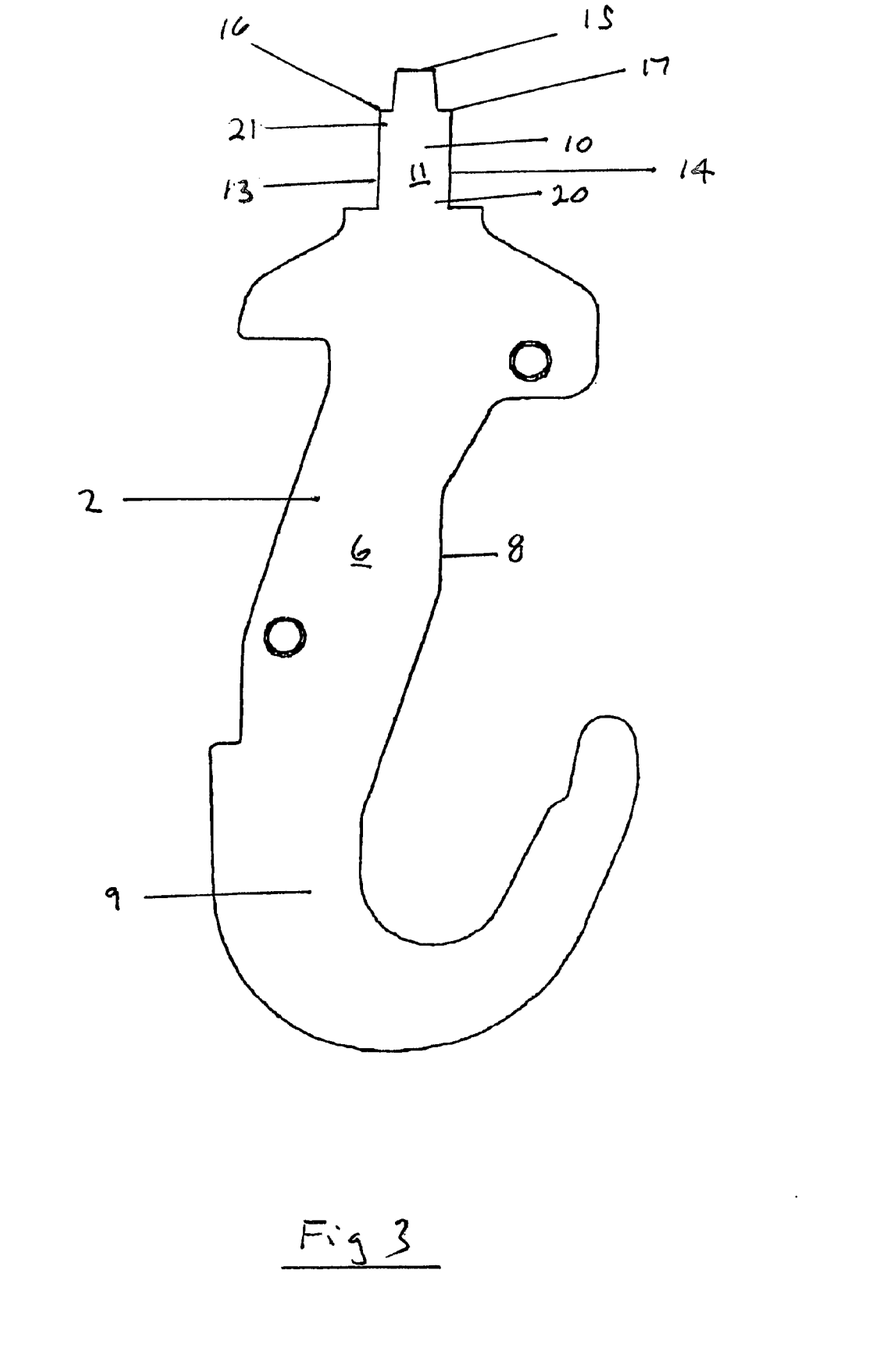
FIG. 3 is a front view of the hook body of the hook shown in FIG. 1.
Figure 4:
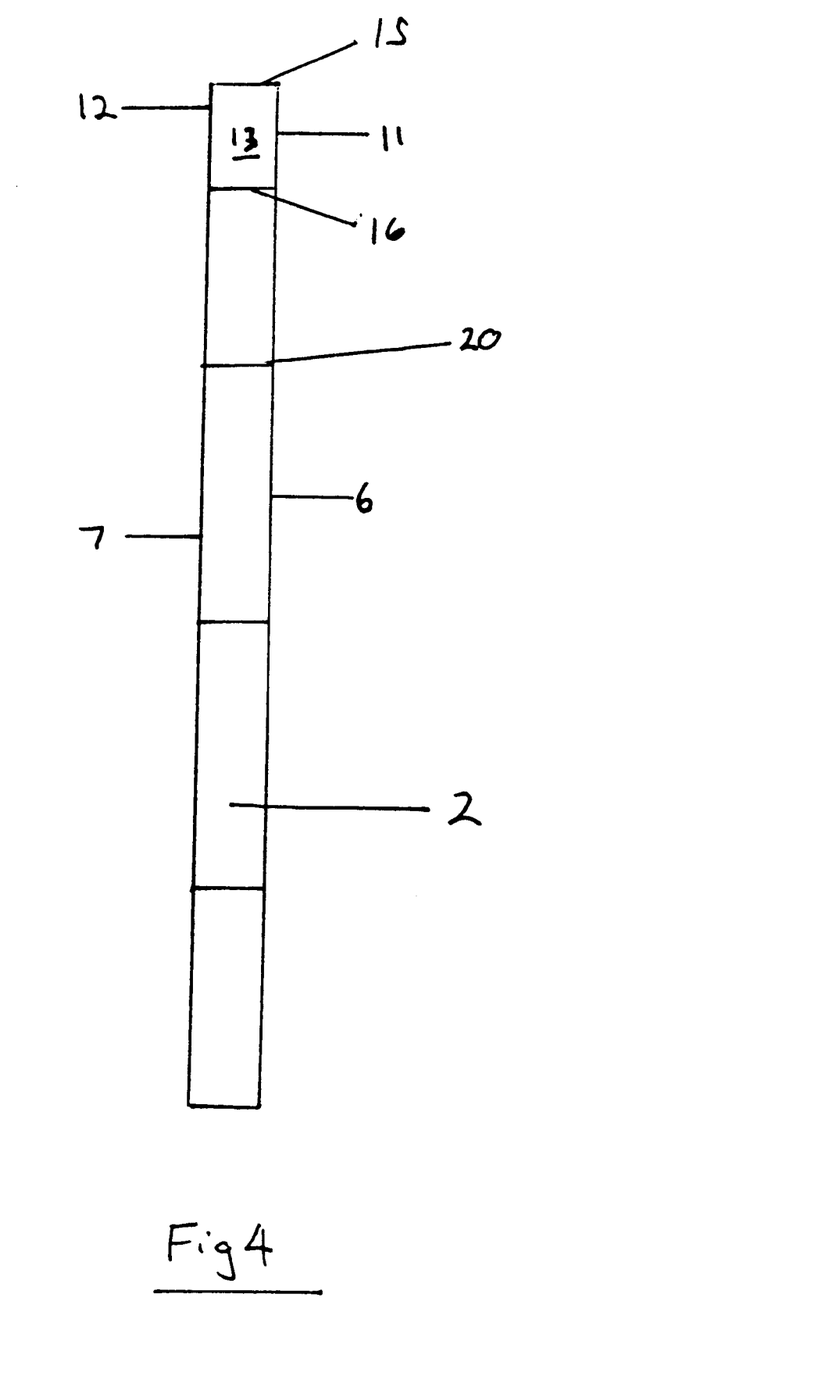
FIG. 4 is a left side view of the hook body shown in FIG. 3.

During the formation of hook body 1, a hook member 9 is created at a first end and a generally rectangular, longitudinally oriented, stem 10 is formed at an opposite second end. As shown in FIGS. 3 and 4, stem 10 is generally rectangular in cross-section with flat, planer, upper and lower surfaces 11 and 12. Due to the nature of the stamping process, stem 10 also has relatively flat, planer, side surfaces 13 and 14 that intersect surfaces 11 and 12 at generally right angles. It is expected that in most applications the width of the upper and lower surfaces of stem 10 will exceed the height of the respective side surfaces such that the major axis of the rectangular cross-section of stem 10 will be parallel to the upper and lower surfaces of the hook body.

Referring to FIG. 3, stem 10 has a base portion 20 at its point of intersection with hook body 2, and an outer end portion 21 that terminates in a tip 15. End portion 21 includes a necked down section of reduced width that forms a pair of inwardly disposed shoulders 16 and 17 on each side of the stem. In one preferred embodiment the portion of stem 10 extending beyond shoulders 17 and 16 has inwardly tapered side surfaces 18 and 19 that terminate in tip 15. The tapering of side surface 18 and 19 provide tip 15 with a generally square cross-sectional configuration. It will be appreciated that the relative length of stem 10 may vary depending upon the size and nature of the swivel connector to be attached to hook body 2. That is, stem 10 could be relatively longer or shorter than the embodiment shown in the attached drawings.

Figure 1:
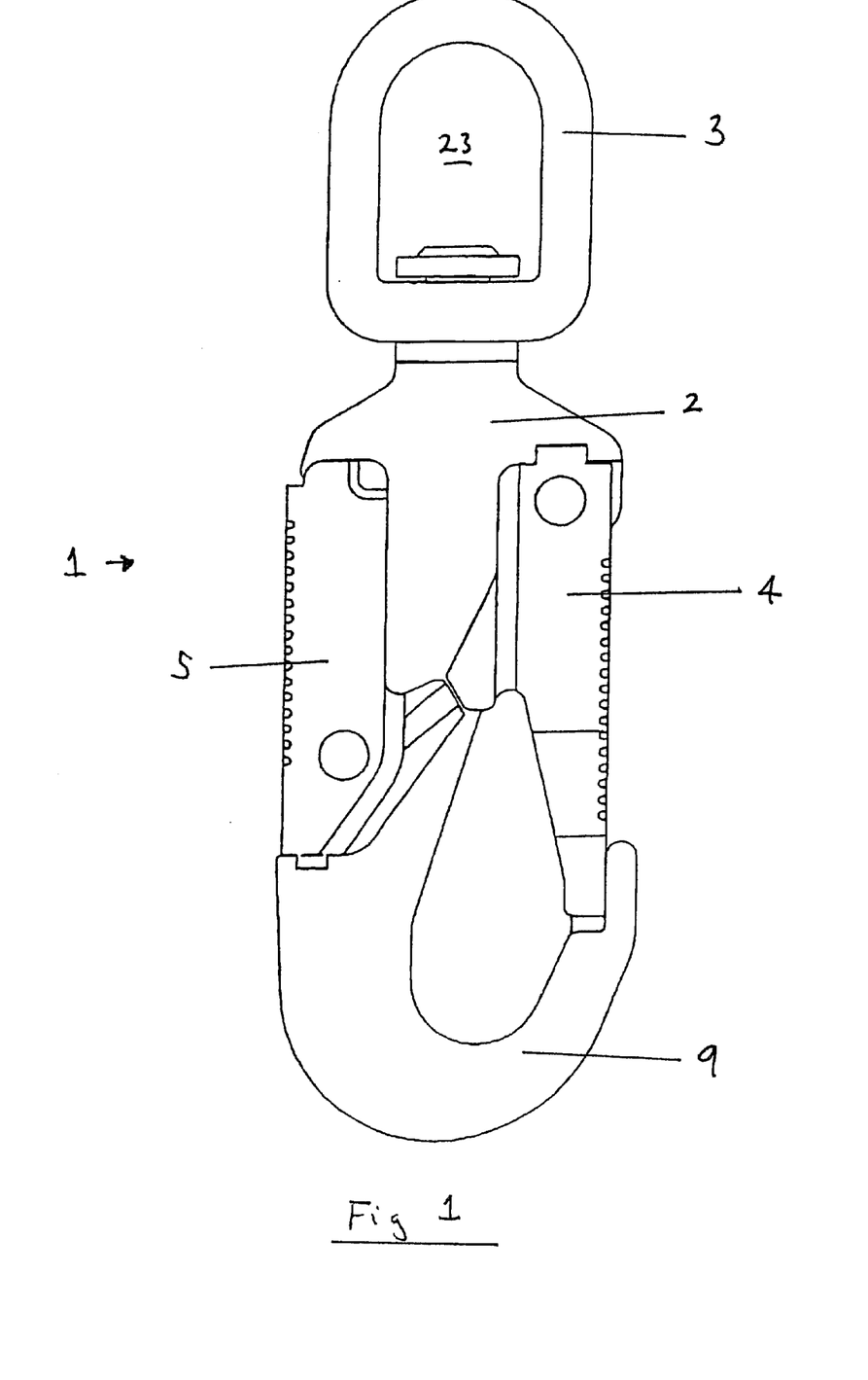
FIG. 1 is a front view of a swivel hook according to one embodiment of the present invention.
Figure 2:
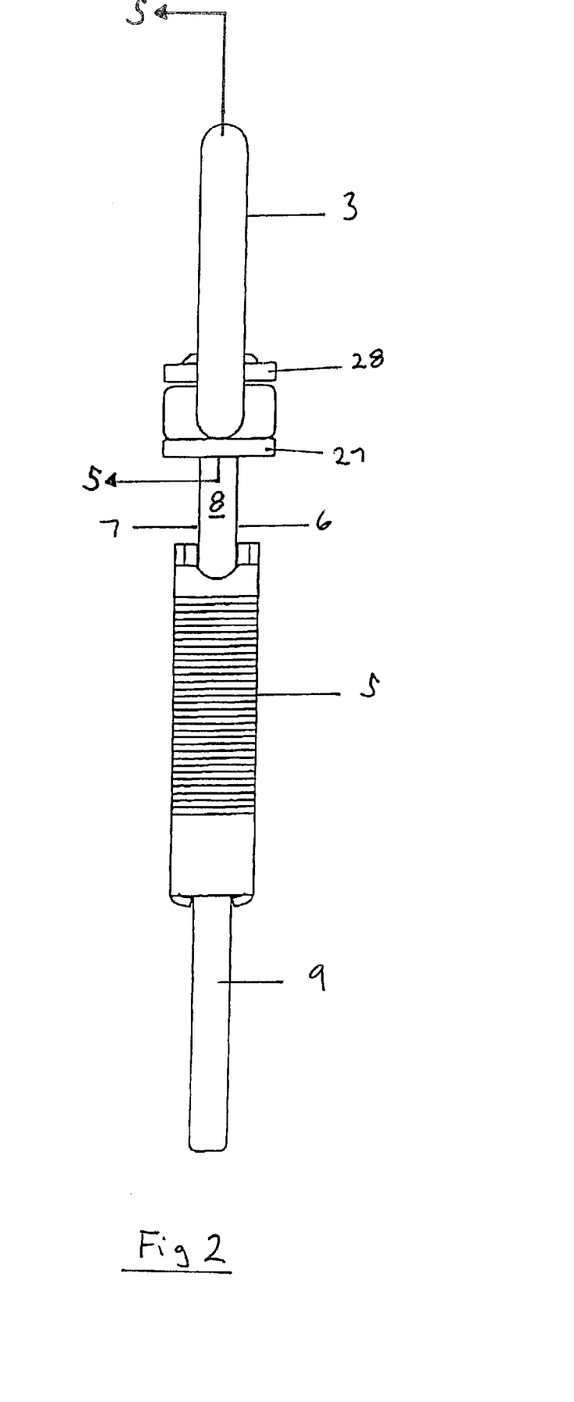
FIG. 2 is a left side view of the hook shown in FIG. 1.
Figures 5, 6, 7, 10:
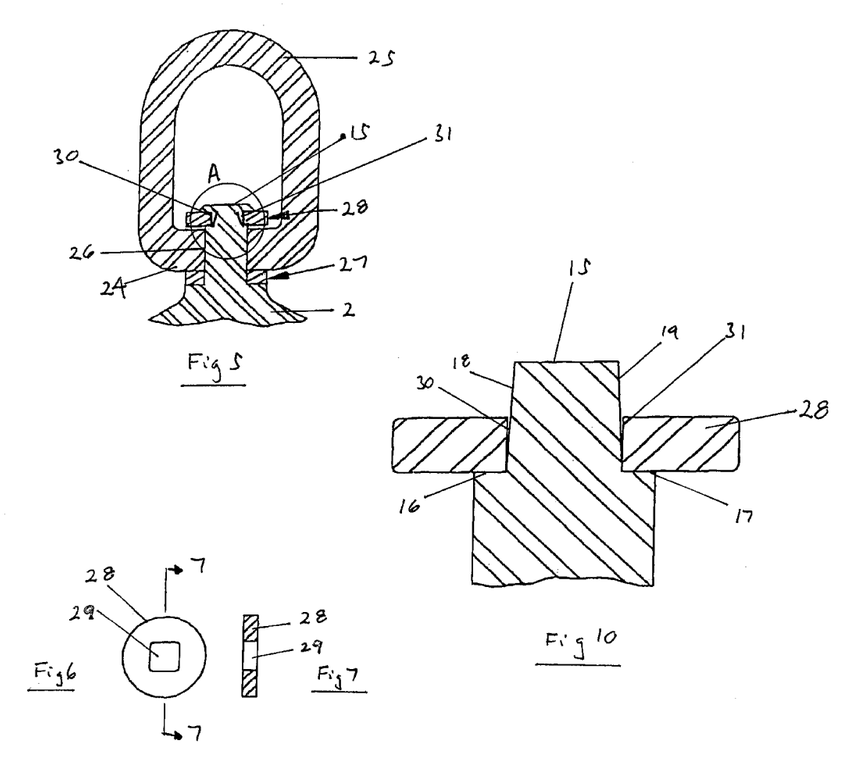
FIG. 5 is a longitudinal sectional view taken along the line 5—5 of FIG. 2.
FIG. 6 is a top plan view of the upper or second washer of the hook shown in FIG. 1.
FIG. 7 is a sectional view taken along the line 7—7 of FIG. 6.
FIG. 10 is a detail view of area "A" of the stem portion of the hook body shown in FIG. 3 having the upper or second washer received thereover.
Figure 8:
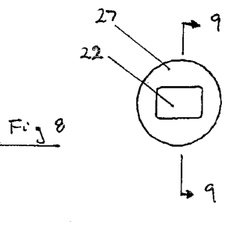
FIG. 8 is a top plan view of the lower or first washer of the hook shown in FIG. 1.
Figure 9:
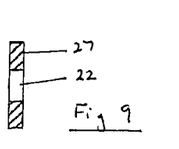
FIG. 9 is a sectional view taken along the line 9—9 of FIG. 8.
Figure 11:
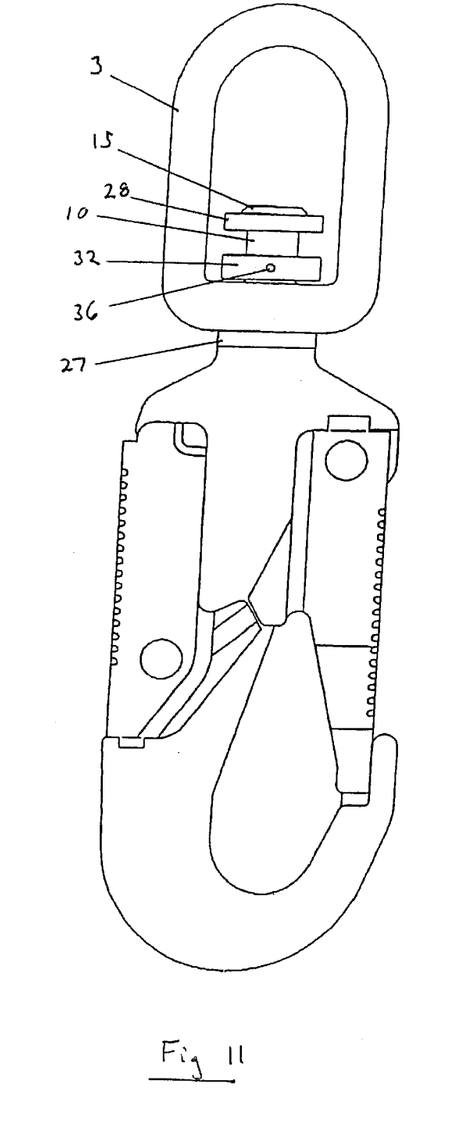
FIG. 11 is a front view of an alternate embodiment of the hook shown in FIG. 1.
Figure 12:
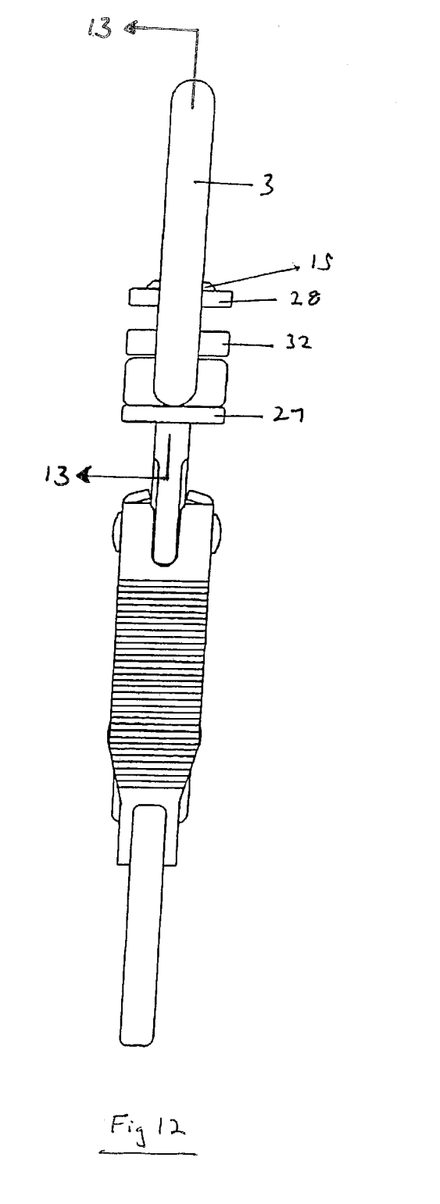
FIG. 12 is a right side view of the hook shown in FIG. 11.
Figure 13:
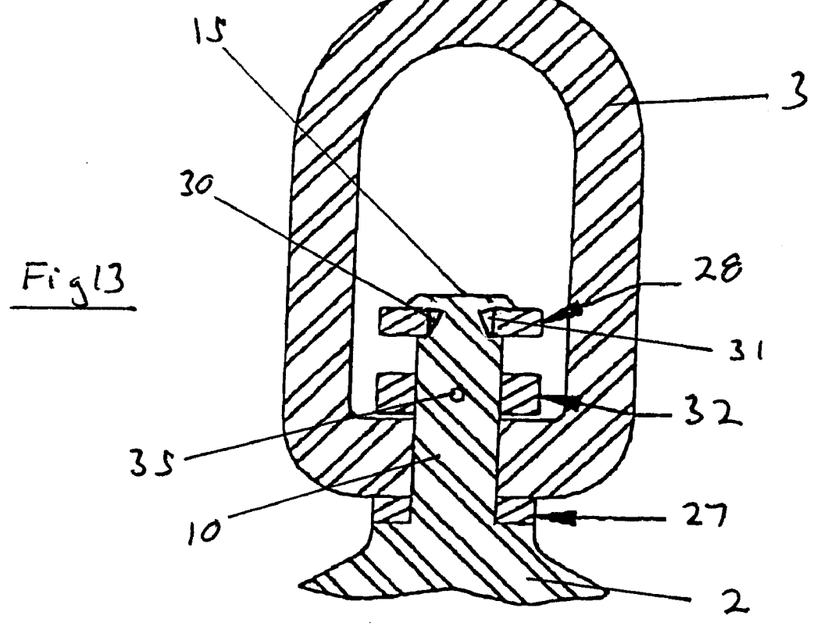
FIG. 13 is a longitudinal sectional view taken along the line 13—13 of FIG. 12.
Figure 14:
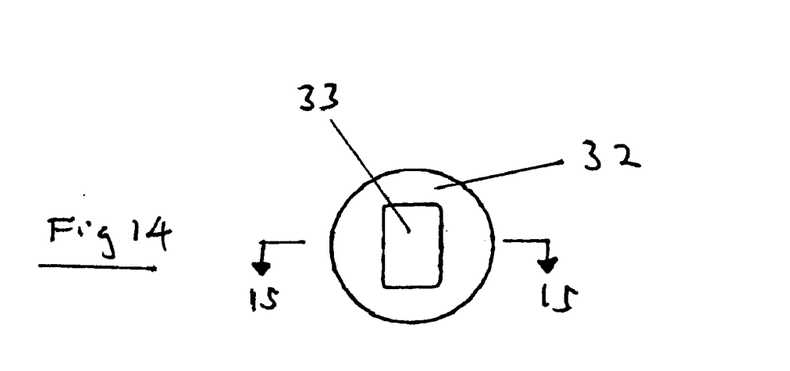
FIG. 14 is a top plan view of the strain gauge of the hook shown in FIG. 11; and, FIG. 15 is a sectional view taken along the line 15—15 of FIG. 14.
Figure 15:
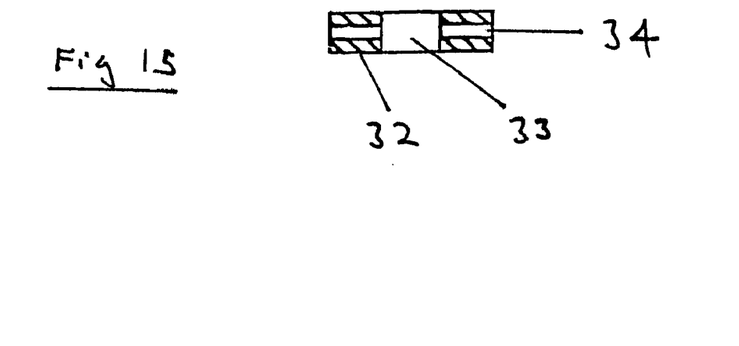

In FIGS. 1, 2 and 5, swivel connector 3 is shown as comprising a swivel eye that is pivotally securable over rectangular stem 10 to provide a means to attach the hook to a cable, rope, strap, etc. Preferably swivel connector 3 is formed from a forged high strength metal having a generally smooth and round exterior surface. As will be appreciated, if swivel connector 3 were formed by way of a stamping process it would contain relatively sharp, right angled surfaces that could cause uneven loading and accelerated wear upon a rope, cable or strap attached thereto. For that reason where swivel connectors or swivel eyes are formed through stamping, typically they must undergo further machining to smooth out such sharp right angled surfaces, thereby adding to the cost of manufacturing such a product.

A forged swivel connector has the further advantage of providing a component having generally superior tensile and compressive loading capabilities, exceeding those of standard stamped or punched products. Since to a large extent the central portion 23 of the swivel connector will be open to allow for the accommodation of a cable, rope etc., the lack of a substantially solid body structure favours a stronger forged product over that that as may be formed by stamping or punching.

In the embodiment shown in the attached drawings, swivel connector 3 has a generally square first end 24 and a rounded or looped second or outer end 25. Rounded end 25 is adapted to receive a rope, cable, or strap thereon, whereas square end 24 preferably includes a generally circular bore 26 of a size that exceeds the rectangular cross-sectional dimensions of stem 10 such that the rectangular stem may be received through the circular bore. The diameter of bore 26 relative to the rectangular dimension of stem 10 permits rotational movement of swivel connector 3 about the stem. Preferably circular bore 10 is centrally located along square end 24 of swivel connector 3 to prevent wobbling of the swivel connector as it rotates about stem 10.

Hook 1 further includes first and second washers 27 and 28 respectively. Washers 27 and 28 are preferably formed from a high strength metallic compound and have centrally located, generally rectangular shaped, right angled bores 22 and 29, respectively, extending therethrough. Bores 22 and 29 are dimensioned so as to permit washers 27 and 28 to be received over rectangular stem 10 while preventing rotational movement of the washers relative to the stem.

As is once again illustrated in FIGS. 1, 2 and 5, in the preferred embodiment rectangular washers 27 and 28 are received over rectangular stem 10 on opposite sides of swivel connector 3. Specifically, first washer 27 is received between hook body 2 and swivel connector 3 while second washer 28 is received over stem 10 between the swivel connector and the end of the rectangular stem, with the tip and a portion of the end of the stem extending through second washer 28. Assembled in this fashion washers 27 and 28 will present a bearing surface against which swivel connector 3 can ride and rotate when under tensile or compressive loading. Rotation of the relatively hard, high strength, forged swivel connector will thus cause minimal wear of hook body 2 or rectangular shaft 10 with the primary rotational movement being and associated friction and wear borne directly by washers 27 and 28. The washers will also present a smooth surface against which swivel connector 3 may rotate making rotation of the connector easier and smoother than would otherwise be the case if the connector was merely allowed to ride against the side surfaces of the hook body.

First and second washers 27 and 28 also add a 3-dimensional aspect to rectangular stem 10 that further enhances the ability of the stem to permit rotational movement and to accept torsional loading. That is, since hook body 2 is formed from a stamping process it is of a generally constant thickness. Without subsequent machining the hook body is generally limited to 2-dimensional structural features. The placement of first and second washers 27 and 28 about rectangular stem 10 on either side of swivel connector 3 essentially permits the rectangular stem to function as a 3-dimensional shaft having a generally circular cross-section, particularly where the washers do not rotate. Without the use of washers 27 and 28 any torsion between the hook body and swivel connector would be borne by a smaller aspect of rectangular stem 10, increasing the likelihood of deformation and failure of the stem. Washers 27 and 28 also help to maintain the hook body and swivel connector in a generally co-planer relationship.

As discussed previously, stem 10 preferably includes a necked down portion of reduced width forming inwardly disposed shoulders 16 and 17 along the side surfaces of its outer end portion. Rectangular stem 10 is preferably of a sufficient length such that shoulders 16 and 17 are formed along the portion of the stem that protrudes through bore 26 of swivel connector 3. The size of rectangular bore 29 through second washer 28 is such that when the second washer is received over the rectangular stem it abuts against shoulders 16 and 17, with the tip portion 15 of stem 10 extending through bore 29.

In the assembly of hook 1, first washer 27 is placed over rectangular stem 10 after which the stem is fed through circular bore 26 in swivel connector 3. The swivel connector abuts first washer 27 with shoulders 16 and 17 protruding through the swivel connector 3. Placement of second washer 28 over the tip of the stem will then enable the second washer to abut against shoulders 16 and 17. In one preferred embodiment of the invention the space between swivel connector 3 and second washer 28 when the second washer is resting against shoulders 16 and 17 is minimal in order to hold the swivel connector in place and prevent excessive longitudinal movement or travel along the stem.

With second washer 28 abutting shoulders 16 and 17, the tip of the stem extending through the washer may be peened, pressed or otherwise deformed until it becomes flattened and extends radially beyond the limits of bore 29. In this fashion it will be appreciated that second washer 28 will be prevented from sliding off the end of rectangular stem 10, and as such the entire assembly will be held together. It will further be appreciated that sloped side surfaces 18 and 19 of the end portion of stem 10 will effectively extend through bore 29 of second washer 28 when the washer is received over the stem and abuts against shoulders 16 and 17. In this manner, as shown more specifically in FIG. 10, laterally positioned and opposed voids 30 and 31 will be formed between bore 29 and the respective tapered side surfaces 18 and 19 of the stem. The peening of tip 15 will thus have the result of deforming and driving material from the tip of the stem into voids 30 and 31. Such material will effectively wedge second washer 2 against shoulders 16 and 17 and enhance both the attachment of the second washer about stem 10 and increase the maximum non-destructed tensile load to which the hook may be subjected. That is, the formation of voids 30 and 31, and their filling of material from the tip of the stem after the tip has been peened or pressed against the second washer, acts as a mechanism by which the integrity of the bond between the stem and the second washer may be increased without the use of other more labour intensive or costly fastening devices or mechanisms.

An alternate embodiment of the invention is shown in FIGS. 11 through 15. In these figures a strain gauge or strain indicator 32 is positioned about rectangular stem 10 in order to present a visual identifier in the event that the hook is subjected to a tensile load that exceeds a pre-determined value. In the embodiment shown in the attached drawings the length of stem 10 has been extended with strain gauge 32 positioned between swivel connector 3 and second washer 28.

Strain gauge 32 would typically comprise a component somewhat similar in overall structure and dimension to first washer 27. Preferably strain gauge 32 will have a rectangular shaped right angled bore 33 that permits receipt of the strain gauge over the stem but prevents its rotation. Strain gauge 32 includes a radial bore 34 extending through it that aligns with a correspondingly shaped bore 35 extending through stem 10. Bores 34 and 35 present an avenue for the insertion of a sheer pin 36 that secures strain gauge 32 to stem 10 and restricts axial movement or sliding of the strain gauge along the stem.

In the event that hook 1 is subjected to a tensile load that exceeds the sheer capacity of sheer pin 36, the pin will fail permitting axial movement of the strain gauge (as well as the swivel connector) along the stem. The axial movement of the strain gauge and swivel connector presents a visual indication that the hook has been subjected to tensile load that either equals or exceeds a pre-determined value. Such a visual indication will alert users of the hook that the structural integrity of the hook may have been compromised and that the hook should be replaced. The construction of sheer pin 36 can be altered in order to accommodate different sizes of hooks and the tensile load bearing capabilities of varying metallic alloys from which the hooks and their components may be constructed.

It is to be understood that what has been described are the preferred embodiments of the invention and that it may be possible to make variations to these embodiments while staying within the broad scope of the invention. Some of these variations have been discussed while others will be readily apparent to those skilled in the art.

We claim:

1. A method of constructing a swivel hook, the method comprising:

(i) forming a hook body by way of a stamping process wherein the hook body is stamped from material having a generally uniform thickness, said hook body formed with a hook member at a first end and a generally rectangular, longitudinally oriented, stem at a second opposite end, said rectangular stem having a base portion connecting said stem to said hook body and an end portion that terminates in an outwardly disposed tip;

(ii) forming a swivel connector by means of a forging process, said swivel connector having a first end securable over said rectangular stem of said hook body and a second end adapted to secure said swivel connector to a rope, cable, tether or object, said first end of said swivel connector having a generally circular bore therethrough for receiving said rectangular stem of said hook body, said bore dimensioned so as to permit rotational movement of said swivel connector about said rectangular stem when received thereon;

(iii) placing a first washer having a rectangular shaped right angled bore over said stem;

(iv) inserting said rectangular stem through said circular bore in said first end of said swivel connector;

(v) placing a second washer having a generally rectangular shaped right angled bore over said rectangular stem and into abutment with said swivel connector with the end of said stem extending through said second washer; and, thereafter, (vi) peening said tip of said rectangular stem extending through said second washer to secure said second washer in place over said rectangular stem.

2. The method as claimed in claim 1 wherein said step of forming said hook body includes the formation of an inwardly disposed shoulder member on opposed side surfaces of said end portion of said rectangular stem, said right angled bore through said second washer dimensioned such that when said second washer is received over said tip of said stem said washer abuts against said shoulders with said tip of said stem extending through said second washer.

3. The method as claimed in claim 2 wherein said step of forming said hook body includes the formation of inwardly tapered side surfaces on said end of said rectangular stem such that placement of said second washer over said tip of said stem and abutting said second washer against said shoulder members forms a lateral void between said bore through said second washer and each of said inwardly tapered side surfaces of said end of said rectangular stem.

4. The method as claimed in claim 3 wherein said step of peening said tip of said rectangular stem includes at least partially filling said lateral voids with deformed material from said tip of said rectangular stem.

5. The method as claimed in claim 1 wherein the step of forging said swivel connector includes the step of forming said second end of said swivel connector with generally smooth and rounded surfaces to minimize friction and wear of a rope, cable or tether that may be attached thereto.

6. The method as claimed in claim 1 including the further step of placing a strain indicator about said rectangular shaft intermediate said swivel connector and said second washer, said strain indicator visually indicating whether said hook has been subjected to a tensile load exceeding a predetermined limit.

* * * * *